United States Patent
Fujimoto

(10) Patent No.: US 8,180,317 B2
(45) Date of Patent: May 15, 2012

(54) PORTABLE TELEPHONE

(75) Inventor: Masao Fujimoto, Nara (JP)

(73) Assignee: Sharp Kabushiki Kaisha, Osaka (JP)

(*) Notice: Subject to any disclaimer, the term of this patent is extended or adjusted under 35 U.S.C. 154(b) by 825 days.

(21) Appl. No.: 11/792,396

(22) PCT Filed: Nov. 10, 2005

(86) PCT No.: PCT/JP2005/020573
§ 371 (c)(1),
(2), (4) Date: Jun. 6, 2007

(87) PCT Pub. No.: WO2006/061970
PCT Pub. Date: Jun. 15, 2006

(65) Prior Publication Data
US 2008/0139169 A1    Jun. 12, 2008

(30) Foreign Application Priority Data
Dec. 7, 2004  (JP) .................................. 2004-354106

(51) Int. Cl.
*H04M 11/04* (2006.01)
(52) U.S. Cl. .............. 455/404.1; 455/414.3; 455/414.2; 455/415; 455/456.1
(58) Field of Classification Search ............... 455/404.1, 455/404.2, 414.3, 414.5, 415, 440, 456.1, 455/426.1, 560
See application file for complete search history.

(56) References Cited

U.S. PATENT DOCUMENTS

| | | | |
|---|---|---|---|
| 6,404,352 B1* | 6/2002 | Ichikawa et al. | 340/988 |
| 6,975,872 B2* | 12/2005 | Cheng | 455/456.1 |
| 7,031,946 B1* | 4/2006 | Tamai et al. | 705/67 |
| 2002/0077075 A1 | 6/2002 | Ikonen et al. | |
| 2004/0152471 A1* | 8/2004 | MacDonald et al. | 455/456.1 |
| 2004/0266457 A1* | 12/2004 | Dupray | 455/456.5 |
| 2005/0096008 A1* | 5/2005 | Shin | 455/404.1 |
| 2005/0123102 A1* | 6/2005 | Beason et al. | 379/45 |
| 2005/0162310 A1* | 7/2005 | Pande et al. | 342/357.12 |
| 2006/0119480 A1* | 6/2006 | Hachiga | 340/572.1 |
| 2006/0220826 A1* | 10/2006 | Rast | 340/479 |
| 2007/0254697 A1* | 11/2007 | Sugio et al. | 455/556.2 |

FOREIGN PATENT DOCUMENTS

| | | |
|---|---|---|
| JP | 11-205851 A | 7/1999 |
| JP | 11-234727 A | 8/1999 |
| JP | 11-312285 A | 11/1999 |
| JP | 2000-1116408 A | 4/2000 |

(Continued)

*Primary Examiner* — Dwayne Bost
*Assistant Examiner* — Inder Mehra
(74) *Attorney, Agent, or Firm* — Birch, Stewart, Kolasch & Birch, LLP

(57) ABSTRACT

A technique to notify an emergency center of the position of a caller making an emergency call using a portable terminal equipped with a position information acquiring function is provided such that reliable and accurate notification of position information is performed in cases of emergency. Upon entry of an emergency call instruction on the portable terminal, a detailed positioning/notifying operation is initiated separately from an outgoing call operation. Even after the call is completed, the positioning operation is prohibited from interruption or termination until the positioning/notifying operation is completed. According to additional features of the invention, if the detailed positioning/notifying operation determines that the current area is not GPS-enabled, a charge wave is outputted and a notification of position information provided by an IC tag is given. Furthermore, if the portable terminal gets out of communication range before completion of the positioning/notifying operation, the positioning/notifying operation is maintained.

11 Claims, 7 Drawing Sheets

FOREIGN PATENT DOCUMENTS

| | | |
|---|---|---|
| JP | 2000-251177 A | 9/2000 |
| JP | 2002-49684 A | 2/2002 |
| JP | 2004-61464 A | 2/2004 |
| JP | 2004-86554 A | 3/2004 |
| JP | 2004-177330 A | 6/2004 |
| KR | 1998-075326 A | 11/1998 |
| WO | WO 2004/016030 A1 | 2/2004 |
| WO | WO 2004/089032 A2 | 10/2004 |

* cited by examiner

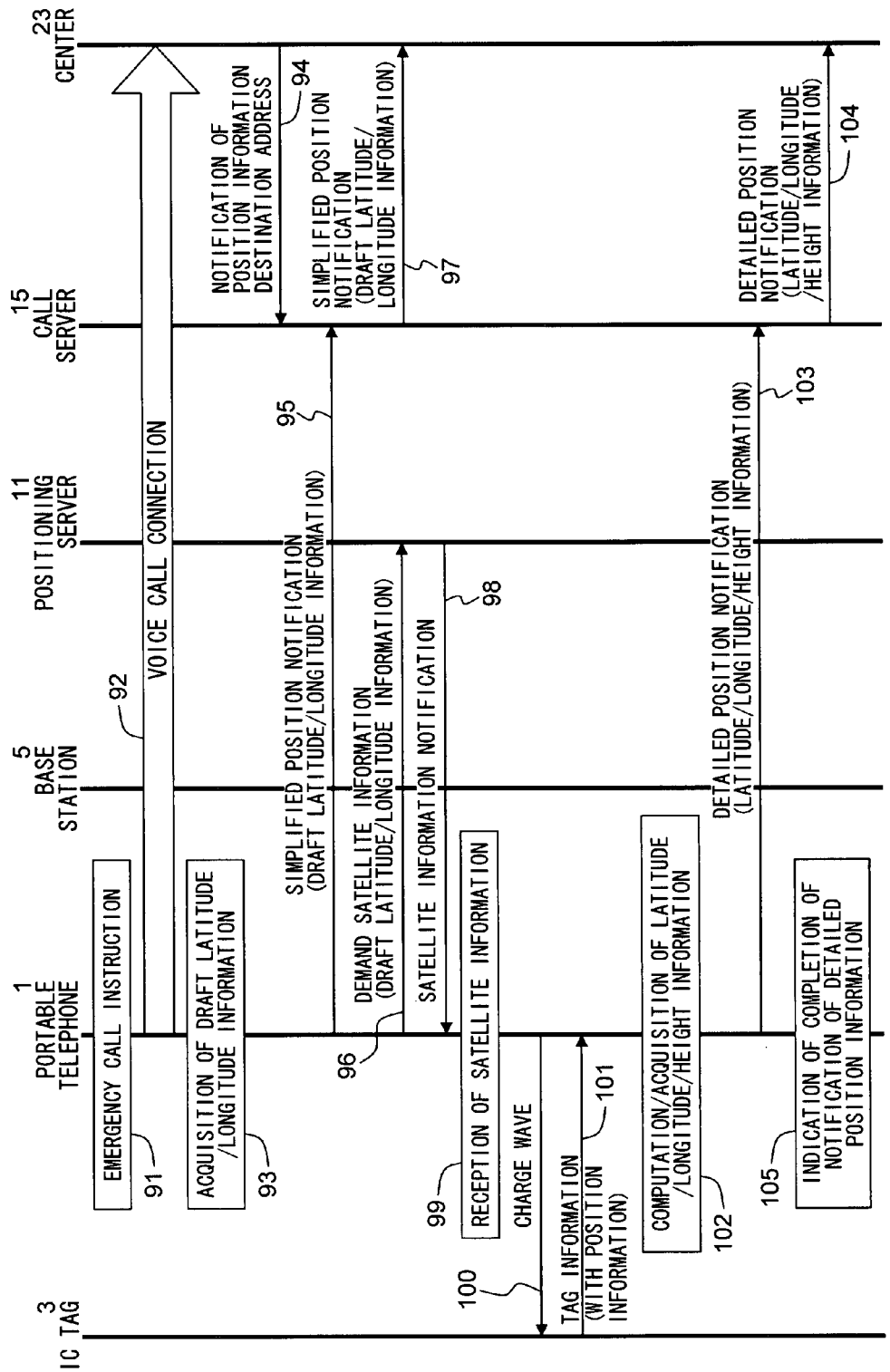

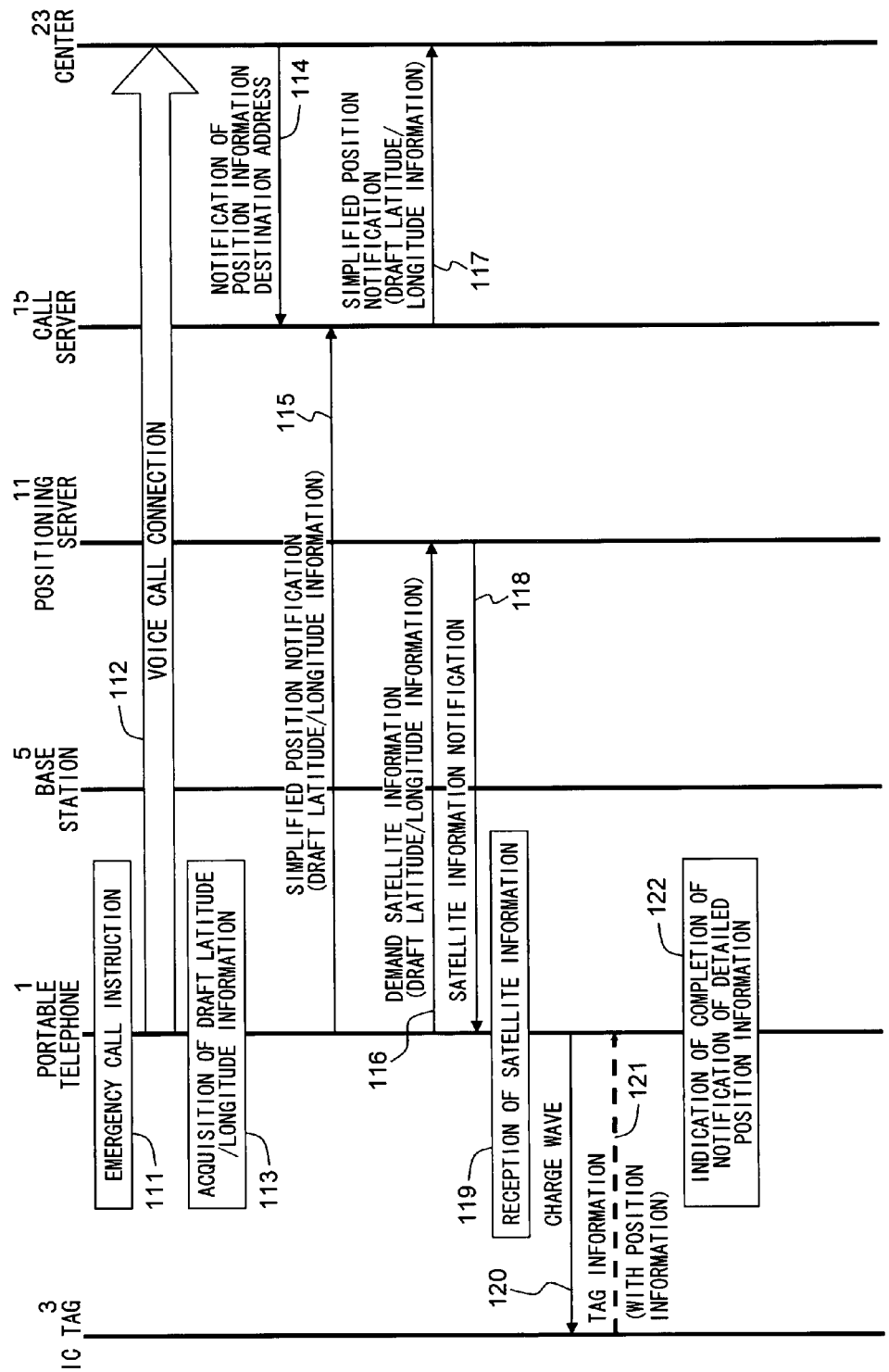

PORTABLE TELEPHONE

TECHNICAL FIELD

The present invention relates to portable terminals, and particularly to a control technique that is used when making an emergency call on a portable terminal capable of acquiring position information.

BACKGROUND ART

Recent years have seen a sharp increase in the ratio of emergency calls originating from portable telephones to the entire emergency calls. Particularly, in Japan, the majority of calls to the police (110) are made from portable telephones. While a system is already established in the fixed telephone services to identify the address of the caller, no system for identifying the position of the portable telephone caller has yet been established.

Swift identification of the position of the caller is extremely important for the quick and reliable handling of an emergency call while it is being made. This calls for the realization, as soon as possible, of a system to enable notification of position information about the caller making an emergency call on a portable telephone. Making the caller enter his or her own position information might hinder the swift handling of an emergency. Thus, there is a need to provide easily services closely related with an individual without requiring the entry of position information or individual/client information by the user.

A technology has been disclosed in which, for example, should a user fall ill or encounter a crime or a disaster, his or her portable terminal device is connected via the Internet to an emergency call server, which is notified of the nature of the emergency call (sickness, accident, crime, etc.). At the same time, the user's individual/client information, such as his or her position information, contact information, insurance number, and so on, is transmitted to the emergency call server. The emergency call server identifies the user's current position based on the acquired position information, and notifies the hospital or police so that an ambulance or a police car can be dispatched. Furthermore, based on the individual/client information, the client's house or company, for example, noted in the contact information is simultaneously notified of the name of the admitting hospital, the condition of the patient, or the like. In addition, the user's past medical history is obtained with reference to the individual/client information, and the hospital is notified of it so that an optimum treatment can be administered (see Patent Document 1, for example).

In another technology, the position of a caller can be identified on a base-station-area basis upon an emergency call from a portable phone, even when the caller does not have a correct understanding of his or her current location, or when the call is suddenly terminated upon the user's entry into an area with bad reception. In this technology, upon detection of an emergency call number, a control station equipment transmits the registered position information that the wireless mobile station provides when moving from the current base station zone into another base station zone, on a communications channel as additional data. In an emergency call receiving device, the position information is stored in a memory unit and used for the identification of the service provider via which the call was made. Map information associated with each of the base station areas, which are determined by each service provider, is stored, and a detailed position can be retrieved by entering surrounding building information, which is managed with a database. The search result is then displayed (see Patent Document 2, for example).

Patent Document 1: JP Patent Publication (Kokai) No. 2002-49684 A
Patent Document 2: JP Patent Publication (Kokai) No. 11-234727 A

DISCLOSURE OF THE INVENTION

Problem to be Solved by the Invention

While Patent Document 1 describes how position information is sent to the emergency call server in case of emergency, it is sometimes difficult even to obtain such position information in case of emergency, and Patent Document 1 does not teach how such position information can be best acquired. While Patent Document 2 discloses a technique to detect the position of the caller on a base-station-area basis even if the call is suddenly terminated, such position information, as it is provided on a base-station-area basis, is too broad to identify an accurate position of the caller during emergency.

It is therefore an object of the invention to provide a technique to allow for the reliable and accurate notification of position information in cases of emergency.

Means to Solve the Problem

The present invention is directed to a technique to notify an emergency center of the position of a caller making an emergency call using a portable terminal equipped with a position information acquiring function. The invention has the following features, among others:

(1) Upon entry of an emergency call instruction (via a one-push button, or entry of the numbers 110, 119, or 118) on a portable terminal, a detailed positioning/notifying operation (positioning based on the GPS or an IC tag, and notification of a position detected thereby) is initiated separately from an outgoing call operation. Even after the call is completed, the positioning operation is not allowed to be interrupted or terminated until the detailed positioning/notifying operation is completed. In this case, the terminal may be controlled as follows:

1) An emergency call operation is maintained until the detailed positioning/notifying operation is completed.
2) During an emergency call operation, an emergency call instruction is considered valid.
3) A simplified positioning operation (such as positioning based on a cell ID) is carried out separately from the detailed positioning operation.
4) In the detailed positioning operation, it is determined whether or not the current area is a GPS positioning-allowed area. If it is determined to be a GPS positioning area, GPS positioning is initiated and a notification of the result of such positioning is given. If the area is determined not to be a GPS positioning area, a charge wave is outputted, and a notification of position information provided by an IC tag is given as a positioning result.

(2) Upon entry of an emergency call instruction (via a one-push button or entry of numbers 110, 119, or 118), a detailed positioning/notifying operation is initiated separately from an outgoing call operation. The detailed positioning/notifying operation involves the determination of whether or not the current area is a GPS positioning-allowed area. If it is determined to be a GPS positioning area, GPS positioning is initiated and a notification of the result of positioning is given. If it is determined not to be a GPS positioning area, a charge wave is outputted and a notification of position information provided by an IC tag is given as a positioning result.

1) If the area is determined not to be a GPS positioning area, and if no position information can be acquired from an IC tag, the detailed positioning/notifying operation is terminated.

2) A simplified positioning/notifying operation (positioning based on a cell ID) is carried out separately from the detailed positioning/notifying operation, and the detailed positioning/notifying operation is terminated after the termination of the simplified positioning/notifying operation.

3) When terminating the detailed positioning/notifying operation without giving notification of a positioning result, the user is notified of the fact that no notification of detailed position information has been given.

(3) Upon entry of an emergency call instruction (via a one-push button, or entry of numbers 110, 119, or 118), a detailed positioning/notifying operation (positioning based on the GPS or an IC tag) is initiated separately from an outgoing call operation. Later, if the device gets out of range for communications before the completion of the detailed positioning/notifying operation, the detailed positioning/notifying operation is maintained.

Effects of the Invention

In accordance with the present invention, upon entry of an emergency call instruction, a process is carried out to obtain more detailed information at the point in time. The most detailed position information available at the current point in time can be sent to a center. Even if the portable terminal enters into a call-terminated state for one reason or another, positioning is continued until its completion so that position information can be obtained, thereby making it possible to deal with emergencies.

Should the portable terminal get out of range during a call, the position information that was measured immediately before disconnection is stored while the positioning/notifying operation is maintained. In this way, the position information that was stored before the portable terminal getting out of range can be immediately transmitted to a center once the portable terminal gets back within range, thereby making it possible to deal with emergencies swiftly.

BRIEF DESCRIPTION OF THE DRAWINGS

FIG. 6 shows a control sequence chart in the case of a non-GPS positioning area where position information could be obtained with an IC tag.

FIG. 7 shows a control sequence chart in the case of a non-GPS positioning area where no position information could be obtained with an IC tag.

DESCRIPTION OF THE REFERENCE NUMERALS

A ... emergency call system, 1 ... portable telephone, 3 ... IC tag, 5a to 5c ... base station controllers in base stations, 7 ... subscriber switching system, 11 ... positioning server, 15 ... call server, 17 ... voice line network, 21 ... packet switching network, 23 ... police/fire/emergency/maritime safety center, 23a ... command center, 23b ... position information acquiring device

BEST MODE FOR CARRYING OUT THE INVENTION

In the present specification, the term "emergency call instruction" refers to the act of dialing any of the emergency call numbers in Japan, such as 110, 119, or 118, for example, for accessing an emergency center responsible for the police, the fire/ambulance, and maritime safety, for example. It is noted that the numbers for accessing such emergency centers differ from one country to another. For example, in the United States and Canada, the number to call is 911; in Britain, it is 999; in Germany, it is 110 or 112; in France, it is 17, 15, or 18; in Australia, it is 000; in South Korea, it is 112 or 119; and in China, it is 110, 119, or 120. The method of dialing may involve the direct entry of numbers using numeric keys, or a one-push dialing system in which these numbers are stored in a memory and read by the operation of a dedicated key or a combination of operations of a plurality of keys (abbreviated dialing).

The term "detailed positioning/notifying operation" herein refers to a sequence of operations involving the acquisition of detailed position information using the GPS or an IC tag and the notification of the acquired position information to an emergency center (such as the police, the fire department, ambulance, maritime safety, or hospital).

The term "simplified positioning/notifying operation" herein refers to the operations involving the acquisition of rough position information in a simplified manner based on position information from the base station, for example, and the notification of the resultant information to an emergency center.

Furthermore, the function to acquire position information includes both the GPS function or an IC tag-reader function provided in the portable terminal itself, and the function of acquiring the position information about the portable terminal from the outside using a communications function.

Figure 1:
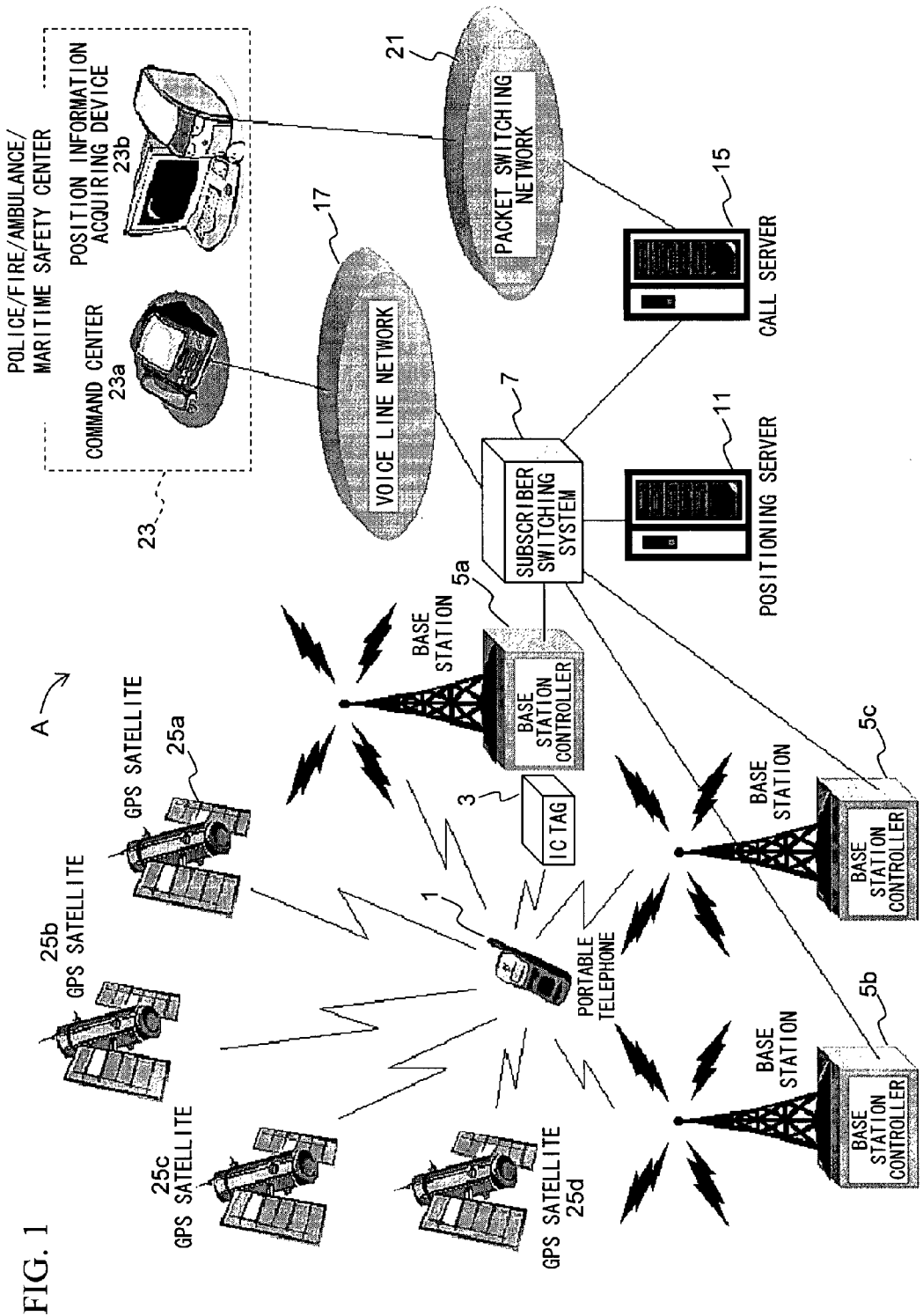
FIG. 1 shows a configuration of an emergency call system including a portable terminal associated with an emergency call instruction according to an embodiment of the invention.
Figure 2:
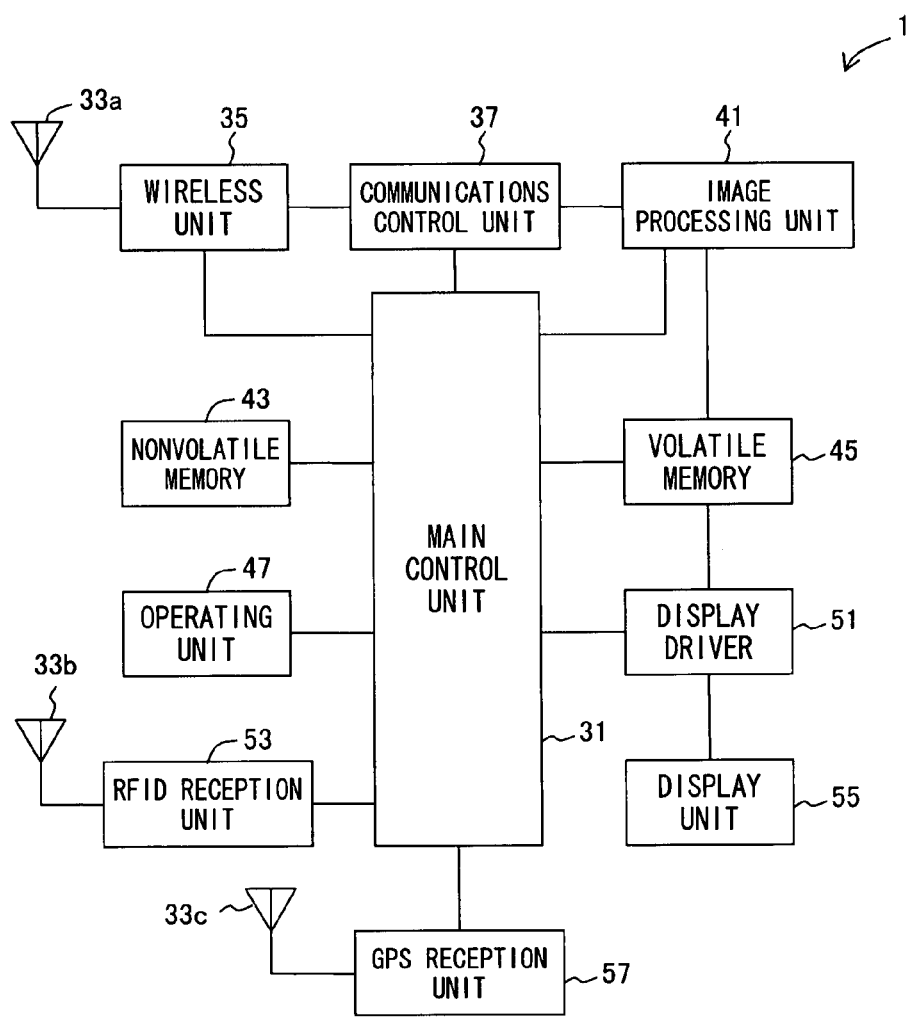
FIG. 2 shows a functional block diagram of a configuration of the portable terminal according to the embodiment.
Figure 3:
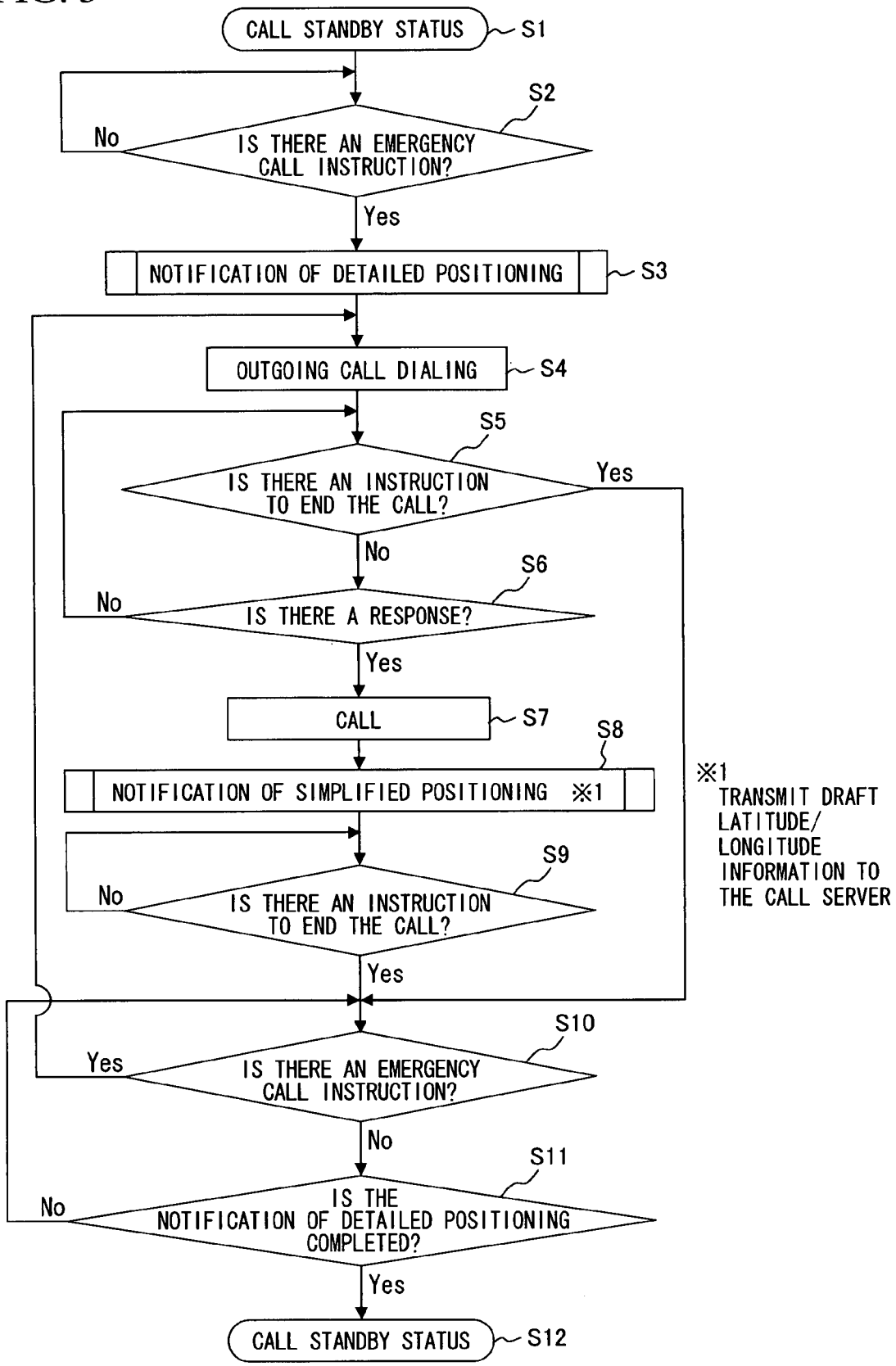
FIG. 3 shows a flowchart of the operation of the portable terminal according to the embodiment.
Figure 4:
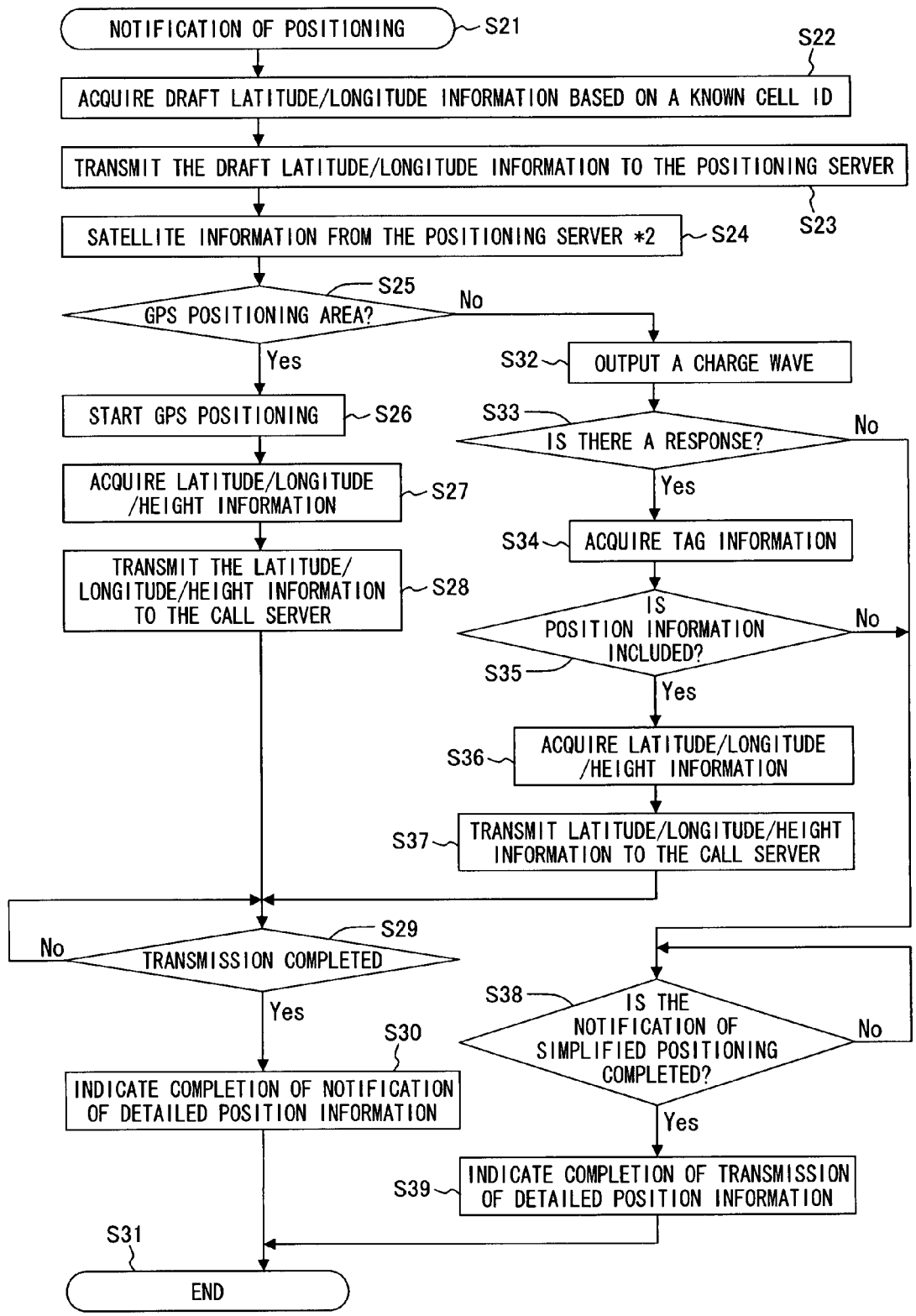
FIG. 4 shows a flowchart of the operation of the portable terminal according to the embodiment.
Figure 5:
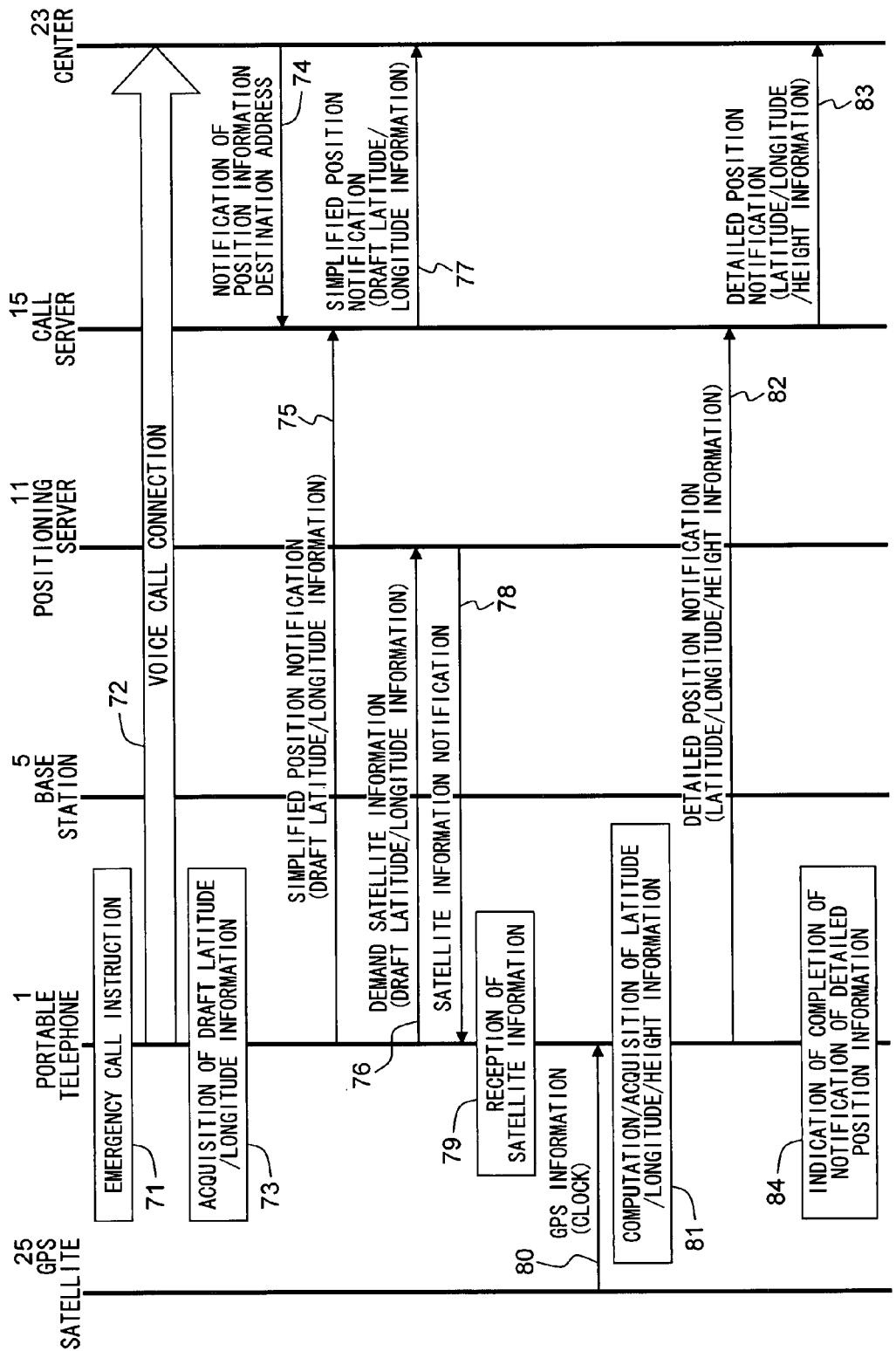
FIG. 5 shows a control sequence chart in the case of a GPS positioning area.

In the following, a portable terminal according to an embodiment of the invention will be described with reference to the drawings. FIG. 1 shows the configuration of an emergency call system including a portable terminal associated with an emergency call instruction according to the present embodiment. FIG. 2 is a functional block diagram of a configuration of the portable terminal according to the present embodiment. FIGS. 3 and 4 show flowcharts of the operation of the portable terminal of the embodiment. FIG. 5 shows a control sequence chart in the case of a GPS positioning area. FIG. 6 shows a control sequence chart in the case of a non-GPS positioning area where position information is acquired from an IC tag. FIG. 7 shows a control sequence chart in the case of a non-GPS positioning area where position information is not obtainable from the IC tag.

As shown in FIG. 1, an emergency call system A according to the present embodiment includes a portable telephone 1, an IC tag 3, base station control equipments 5a to 5c in base stations, a subscriber switching system 7, a positioning server 11, a call server 15, a voice line network 17, a packet switching network 21, a police/fire/ambulance/maritime safety center 23, and GPS satellites 25a to 25d (positioning means). The police/fire/ambulance/maritime safety center 23 includes a command center 23a and a position information acquiring device 23b.

The portable telephone 1 is capable of acquiring its own current position information from the IC tag 3, the base station control equipments 5a to 5c in the base stations, or the GPS satellites 25a to 25d, though with varying positioning accuracies. The subscriber switching system 7 can be connected to the command center 23a via the voice line network 17. The positioning server 11 determines if any of the base station control equipments 5a to 5c is associated, via the subscriber switching system 7, with the portable telephone 1. Based on the position information about the associated base station, the positioning server 11 notifies the command center 23a of the rough current position of the portable telephone 1 via the voice line network 17. The call server 15 is connected, via the packet switching network 21, to the position information acquiring device 23b. It is also connected, via the subscriber switching system 7 and the voice line network 17, to the command center 23a. The command center 23a and the position information acquiring device 23b are configured such that the calls made through the voice line network 17 and the position information acquired via the packet switching network 21 can be matched with each other.

As shown in FIG. 2, the portable telephone 1 includes a main control unit 31, a wireless unit 35 with a first antenna 33a, an RFID reception unit 53 with a second antenna 33b, a GPS reception unit 57 with a second antenna 33c, a wireless unit 35, a communications control unit 37, an image processing unit 41, a nonvolatile memory 43, a volatile memory 45, an operating unit 47, a display driver 51, a display unit 55, and a GPS reception unit 57 with a third antenna 33c. The portable telephone 1 is capable of measuring (acquiring) its own current position using the wireless unit 35, the RFID reception unit 53, and the GPS reception unit 57, and accessing the police/fire/ambulance/maritime safety center 23 via the wireless unit 35, the antenna 33a, and the base station.

First, an emergency call operation is described with reference to FIG. 3. As shown in FIG. 3, an emergency call instruction is awaited in step S2 following a call standby state in step S1. Upon reception of an emergency call instruction (Yes), an operation for detailed positioning/notification is carried out in step S3, as will be described later. In step S4, a dial callout is initiated, and it is determined in step S5 whether or not there is an outgoing-call terminating instruction. If there is an outgoing-call terminating instruction, the process proceeds to step S10. If there is no outgoing-call terminating instruction, the process proceeds to step S6 where it is determined whether or not there is a response. If there is no response (No), the process returns to step S5. If there is a response (Yes), the process proceeds to step S7 and a call is made, followed by a simplified positioning/notification that is carried out in step S8 (whereby draft latitude/longitude information is transmitted to the call server). In step S9, a call terminate instruction is awaited. Upon reception of a call terminate instruction (Yes), the process proceeds to step S10 where it is determined whether or not there is another emergency call instruction. If there is another emergency call instruction, the process returns to step S4. If there is no another emergency call instruction (No), the process proceeds to step S11 where it is determined whether or not the detailed positioning/notification has been completed (step S11). If it has not been completed (No), the process returns to step S10. If it has been completed (Yes), the process proceeds to step S12 where the device is placed in a call standby state.

Thus, upon reception of an emergency call instruction (via one-push button, or entry of numbers 110, 119, or 118) (step S2), a detailed positioning/notifying operation (positioning based on the GPS or an IC tag) is initiated separately from an outgoing call operation (step S3), and the positioning operation is prohibited from being interrupted or terminated even after the end of the call (step S10) until the detailed positioning/notifying operation is completed (step S11). In this way, the emergency call operation is maintained (i.e., the device does not transition into a standby state) until the end of the detailed positioning/notifying operation, while other applications (such as mail or network games) that utilize the packet switching network 21 are prohibited from being activated, and so is the power on/off operation of the portable telephone. Thus, notification of positioning information can be given without fail during an emergency call operation.

Furthermore, even in a case where the detailed positioning/notification has not been completed (step S11), another emergency call instruction is made valid (step S10) so that, for example, a user who is involved with or witnessed a traffic accident can call the police and the fire department in succession in a smooth manner. The valid destinations during an emergency call operation may include parties that are registered in an electronic telephone book in the portable telephone.

Further, by carrying out the simplified positioning/notifying operation (positioning using the cell ID: step S8) separately from the detailed positioning/notifying operation (step S3), the rough direction in which the emergency vehicle, such as an ambulance, should move can be simply known, though the relevant position accuracy is somewhat low. Therefore, such information may be transmitted as a stop-gap measure, and then, upon acquisition of more accurate position information, the vehicle can reach the site by referring to the detailed information. Such position information that is communicated by the simplified positioning/notifying operation may be generated from the draft latitude/longitude information acquired by the detailed positioning/notifying operation, which will be described later.

In the above-described operation control, upon reception of an outgoing-call terminating instruction (step S5), interruption or termination of the positioning operation is prohibited until the detailed positioning/notifying operation is completed (step S11). As a result, the positioning information can be reliably communicated in case of an emergency call, thereby enabling the handling of emergencies where the user cannot even begin to talk, and discouraging prank calls. Alternatively, a simplified positioning/notifying operation may be carried out instead of the detailed positioning/notifying operation. Further alternatively, the portable terminal may be configured such that no position information is communicated upon entry of an outgoing-call terminating instruction.

In the following, the detailed positioning/notifying operation is described with reference to FIG. 4. As shown in FIG. 4, following the reception of a positioning notification in step S21, draft latitude/longitude information is acquired based on a known cell ID in step S22. In step S23, the draft latitude/longitude information is transmitted to the positioning server 11. In step S24, satellite information is received from the positioning server. The "satellite information" herein refers to the information about the angles or the like of a satellite that is available at the position of the draft latitude/longitude. In step S25, it is determined whether or not the current area is a GPS positioning area (where GPS positioning is possible). If it is a GPS positioning area (Yes), the process proceeds to step S26 where, using the satellite information received in step S24, GPS positioning is started. In step S27, latitude/longitude/height information is acquired. In step S28, the latitude/longitude/height information is transmitted to the call server 15. In step S29, it is determined whether or not the transmission of the latitude/longitude/height information has been completed. Upon completion of the notification of the detailed position information, the user of the portable telephone 1 is notified of that effect (step S30) and the process comes to an end (step S31). If the transmission is not completed (No), this could be interpreted as the device having gotten out of range for communications service, so the device waits for the completion of transmission. In this case, the latitude/longitude/height information that was available immediately before the device getting out of range can be transmitted at any time once the device is back within a communications area.

If it is determined in step S25 that the area is not a GPS positioning area (No), a charge wave is outputted in step S32, and it is determined whether or not there is a response from the IC tag 3 (step S33). If there is (Yes), tag information is acquired (step S34). In step S35, it is determined whether or not the tag information contains position information. If the tag information contains position information (Yes), latitude/longitude/height information is acquired in step S36, and the latitude/longitude/height information is transmitted to the call server 15, followed by step S29. If it is determined in step S35 that the tag information does not contain position information (No), the process proceeds to step S38, which will be described later. In step S39, the user of the portable telephone 1 is notified of the unsuccessful completion of the notification of detailed position information (step S31). In this way, the user of the portable telephone can be informed of the need to look for an emergency vehicle or the like by himself.

Thus, in the detailed positioning/notifying operation, it is determined whether or not the current area is a GPS positioning-allowed area, and if it is determined to be a GPS positioning area, GPS positioning is initiated and a notification of the positioning result is given. If it is determined not to be a GPS positioning area, a charge wave is outputted and a notification of the position information acquired from the IC tag is given as a positioning result. In this way, as accurate information as possible can be obtained under the current circumstances, and the user of the portable telephone 1 can be notified of how much information has been communicated to the center 23.

In the following, control sequences are described in more specific terms.

(1) A Control Sequence in the Case of a GPS Positioning Area (FIG. 5)

As shown in FIG. 5, upon entry of an emergency call instruction 71 on the portable telephone 1, a voice call connection 72 is established with the center 23, while in the portable telephone 1 a process for acquiring the draft latitude/longitude information is carried out (73). Upon establishment of the voice call connection, the center 23 notifies the call server 15 of a position information destination address (74).

When the process for acquiring the draft latitude/longitude information is completed in the portable telephone 1 (73), the portable telephone 1 notifies the call server 15 of simplified position information (draft latitude/longitude information) (75). The call server 15, using the position information destination address given by the center 23, notifies the center 23 of the simplified position information (draft latitude/longitude information) (77). The portable telephone 1, using the acquired draft latitude/longitude information, demands satellite information from the positioning server 11 (76). In response, the positioning server 11 notifies the portable telephone 1 of satellite information based on the draft latitude/longitude information (78).

Upon reception of the satellite information (79), the portable telephone 1 receives GPS information (clock) 80 from the GPS satellite 25 based on the satellite information. Using the GPS information and the satellite information, the portable telephone 1 computes and acquires latitude/longitude/height information (81). The portable telephone 1 then notifies the call server 15 of the detailed information (latitude/longitude/height information) (82). The call server 15, using the position information destination address given by the center 23, notifies the center 23 of the detailed information (83). Following the notification of the detailed information to the call server 15, the completion of the notification of the detailed position information is indicated on the portable telephone 1 (84). Through these steps, the process of acquiring the position information in the GPS positioning area is completed.

In this way, within the GPS positioning area, the call server 15 can be notified of more detailed position information based on the GPS in addition to the simplified position notification, so that the center 23 can be notified of the position of the portable telephone 1 more accurately.

(2) A Control Sequence in the Case of a Non-GPS Positioning Area Where Position Information Can Be Obtained from an IC Tag (FIG. 6)

As shown in FIG. 6, upon entry of an emergency call instruction 91 on the portable telephone 1, a voice call connection 92 is established with the center 23 while a process for acquiring draft latitude/longitude information is carried out in the portable telephone 1 (93). Upon establishment of the voice call connection, the center 23 notifies the call server 15 of a position information destination address (94).

When the process for acquiring draft latitude/longitude information is completed in the portable telephone 1 (93), the portable telephone 1 notifies the call server 15 of simplified position information (draft latitude/longitude information) (95). The call server 15, using the position information destination address given by the center 23, then notifies the center 23 of the simplified position information (draft latitude/longitude information) (97). The portable telephone 1, using the acquired draft latitude/longitude information, demands satellite information from the positioning server 11 (96). In response, the positioning server 11 notifies the portable telephone 1 of the satellite information (98).

Then, the portable telephone 1 receives the satellite information (99). If it is determined that the device is outside a GPS positioning area based on the satellite information, the portable telephone 1, in order to obtain detailed information instead of the satellite information, outputs a charge wave (100). Upon reception of the charge wave, the IC tag 3 outputs tag information (with position information) 101 to the portable telephone 1. Based on the tag information from the IC tag 3, the portable telephone 1 acquires the latitude/longitude/height information (102) and notifies the call server 15 of the detailed position (latitude/longitude/height information) (103). The call server 15, using the position information destination address given by the center 23, notifies the center 23 of the detailed position (latitude/longitude/height information) (104). In addition, the completion of the notification of the detailed position information is indicated on the portable telephone 1 (105). Through these steps, position information is acquired even outside the GPS positioning area based on the IC tag.

(3) A Control Sequence in the Case of a Non-GPS Positioning Area Where Position Information Cannot Be Obtained from an IC Tag (FIG. 7)

As shown in FIG. 7, upon entry of an emergency call instruction 111 on the portable telephone 1, a voice call connection 112 is established with the center 23 while a process for acquiring draft latitude/longitude information is carried out in the portable telephone 1 (113). Upon establishment of the voice call connection, the center 23 notifies the call server 15 of a position information destination address (114).

When the process for acquiring the draft latitude/longitude information is completed in the portable telephone 1 (113), the portable telephone 1 notifies the call server 15 of simplified position information (draft latitude/longitude) (115). The call server 15, using the position information destination address given by the center 23, notifies the center 23 of the simplified position information (draft latitude/longitude information) (117). The portable telephone 1, using the acquired draft latitude/longitude information, then demands satellite information from the positioning server 11 (116). In response, the positioning server 11 notifies the portable telephone 1 of the satellite information (118).

The portable telephone 1 then receives the satellite information (119). If it is determined that the portable telephone is outside a GPS positioning area based on the satellite information, the portable telephone 1 outputs a charge wave to the IC tag 3 in order to obtain detailed information in lieu of the satellite information (120). Upon reception of the charge wave, the IC tag 3 outputs tag information (without position information) 121 to the portable telephone 1. If the IC tag 3 does not respond to the charge wave or if there is no IC tag 3 around the portable telephone 1, there is no output of tag information in response to the charge wave. If the tag information from the IC tag 3 does not include position information, or no tag information is received, the portable telephone 1 determines that it failed to acquire the position information, and indicates the unsuccessful completion of the notification of the detailed position information (122). In this way, the user of the portable telephone 1 is notified of the fact that the device is ready for a next operation.

As described above, in the portable telephone in accordance with the present embodiment, a process is carried out to obtain the most detailed information possible upon entry of an emergency call instruction. The most detailed position information available at the current point in time can be sent to the center. Further, if the portable terminal enters into a line disconnected state for one reason or another, the portable terminal does not transition into a call standby state until positioning is completed and position information is obtained. In this way, emergencies can be dealt with. Should the portable terminal get out of range during a call, the position information that was measured immediately before the disconnection is stored, and the positioning/notifying operation is maintained. In this way, when the portable terminal got back within range, the position information that was stored prior to disconnection can be immediately transmitted to the center, thus making it possible to deal with emergencies swiftly.

INDUSTRIAL APPLICABILITY

The invention can be utilized in GPS portable telephones, for example, that are capable of making an emergency call.

The invention claimed is:

1. A portable terminal having a function for acquiring position information, comprising:
a control unit for exerting control such that, upon entry of an emergency call instruction, a detailed positioning/notifying operation is initiated independently of and carried out concurrently with an ongoing outgoing voice call, wherein
the control unit prohibits the detailed positioning/notifying operation from being interrupted or terminated even after the end of the outgoing voice call until the detailed positioning/notifying operation is completed.

2. The portable terminal according to claim 1, wherein the control unit exerts control such that an emergency call operation is maintained until the detailed positioning/notifying operation is completed.

3. The portable terminal according to claim 1 or 2, wherein the control unit exerts control such that, during the emergency call operation, the emergency call instruction is rendered valid.

4. The portable terminal according to claim 1, wherein the control unit exerts control such that a simplified positioning/notifying operation is carried out independently of the detailed positioning/notifying operation.

5. The portable terminal according to claim 1, wherein the control unit exerts control such that, in the detailed positioning/notifying operation, it is determined whether or not a current area is a GPS positioning-allowed area, and when the current area is determined to be a GPS positioning area, GPS positioning is initiated and a notification of a positioning result is given, whereas when the current area is determined not to be a GPS positioning area, a charge wave is outputted and a notification of position information based on an IC tag, if obtained, is given as a positioning result.

6. The portable terminal according to claim 5, wherein, upon entry of an emergency call instruction, a detailed positioning/notifying operation is initiated independently of an outgoing call operation, wherein the detailed positioning/notifying operation is maintained even if the portable terminal later gets out of range of a communications service area before completion of the detailed positioning notification.

7. An emergency call system comprising:
the portable terminal according to claim 1; and
an emergency call center for receiving an emergency call and position information based on an emergency call instruction entered on the portable terminal.

8. The portable terminal according to claim 1, wherein the control unit exerts control such that another emergency call instruction is made valid even in a case where the detailed positioning/notification operation has not been completed.

9. The portable terminal according to claim 1, wherein the control unit exerts control such that when the portable terminal gets out of range during a call, the position information measured immediately before a disconnection is stored and the detailed positioning/notifying operation is maintained.

10. A method for making an emergency call using a portable terminal having a function for acquiring position information, the method comprising the steps of:
initiating, independently of and carried out concurrently with an ongoing outgoing voice call, a detailed positioning/notifying operation upon reception of an emergency call instruction;
carrying out said outgoing voice call; and
entering into a standby state on condition that the step of making the outgoing voice call has been completed and that the step of giving a notification of detailed positioning acquired by the detailed positioning/notifying operation has been carried out.

11. The emergency call method according to claim 10, further comprising the step of carrying out a simplified positioning/notifying operation independently of the detailed positioning/notifying operation, the simplified positioning/notifying operation providing position information having lower accuracy than the position information obtained by the detailed positioning/notifying operation.

* * * * *